(12) United States Patent
Aizawa

(10) Patent No.: US 6,212,463 B1
(45) Date of Patent: Apr. 3, 2001

(54) ANTISKID CONTROL APPARATUS

(75) Inventor: Hideyuki Aizawa, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/414,902

(22) Filed: Oct. 8, 1999

(30) Foreign Application Priority Data

Nov. 25, 1998 (JP) .................................. 10-334284

(51) Int. Cl.$^7$ ...................................................... B60T 8/58
(52) U.S. Cl. ............................ 701/80; 701/71; 303/176; 303/191
(58) Field of Search .................................. 701/71, 73, 76, 701/80; 73/105; 180/197; 303/121, 176, 191

(56) References Cited

U.S. PATENT DOCUMENTS

| 4,984,163 | * | 1/1991 | Kuwana et al. | ...................... 701/80 |
| 5,852,243 | * | 12/1998 | Chang et al. | ........................... 701/80 |
| 6,089,682 | * | 7/2000 | Ishikawa et al. | ........................ 701/80 |

FOREIGN PATENT DOCUMENTS 9-226548   9/1997   (JP) .

* cited by examiner

Primary Examiner—Gary Chin
(74) Attorney, Agent, or Firm—Oliff & Berridge, PLC

(57) ABSTRACT

An antiskid control apparatus has magnetic rotational speed sensors for the respective wheels and is adapted to control the brake force, based on a speed of a first wheel and a speed of a second wheel during braking of a vehicle. When an antiskid control computer detects a road surface under road heating during execution of the brake force control of the vehicle, the computer terminates the brake force control of the vehicle where it is assumed that the vehicle is in a state of a predetermined speed.

3 Claims, 4 Drawing Sheets

ANTISKID CONTROL APPARATUS

BACKGROUND OF THE INVENTION

1. Field of the Invention

The present invention relates to an antiskid control apparatus for controlling the brake force of a vehicle, based on wheel speeds of the respective wheels.

2. Related Background Art

There are a variety of suggestions about vehicle control apparatus for controlling the vehicle, based on rotational speed signals of the wheels outputted from speed sensors set at the respective wheels, and there exists the antiskid control apparatus as a typical example. Electromagnetic induction type speed sensors are used commonly for detecting the rotational speeds of the wheels in this antiskid control apparatus. The electromagnetic induction type speed sensors are sensors making use of the phenomenon in which rotation of a gearlike sensor rotor causes magnetic flux passing in a coil provided in the sensor to vary with time and generate ac voltage of a frequency proportional to the rotational speed of the sensor rotor.

Incidentally, in cold districts road heaters for snow melting are buried in road surfaces of hills or the like in order to prevent a skid of wheels. Specifically, as illustrated in FIG. 4, road heaters 64 for snow melting are buried under the surface of uphill road 60 and under the surface of downhill road 62, for the purpose of melting snow on the road surfaces and preventing freezing of the road surfaces by heat from the road heaters 64, thereby preventing a skid of wheels.

SUMMARY OF THE INVENTION

However, since heater current (alternating current of 60 Hz or 50 Hz) flows in the road heaters 64, the heater current induces an alternating magnetic field where the vehicle is located above the road heaters 64. This alternating magnetic field varies the magnetic flux passing the electromagnetic induction type speed sensors. There are some cases wherein this variation in the magnetic flux is detected and judged as a certain vehicle speed though the vehicle is at a standstill. When the vehicle goes into the road surface under road heating during execution of antiskid control, the antiskid control is kept on to continue generation of actuator sound and transmission of vibration to the brake pedal.

A challenge of the present invention is to provide an antiskid control apparatus free of the influence of the heater noise from the road heaters.

This antiskid control apparatus is an antiskid control apparatus having magnetic rotational speed sensors provided for respective wheels and adapted to control brake force, based on a speed of a first wheel and a speed of a second wheel during braking of a vehicle, the antiskid control apparatus comprising road surface detecting means for detecting a road surface under road heating, and assuming means for assuming that the vehicle is in a state of a predetermined speed, wherein when the road surface detecting means detects the road surface under road heating during execution of the brake force control of the vehicle and when the assuming means assumes that the vehicle is in the state of the predetermined speed, the brake force control of the vehicle is terminated.

Since this antiskid control apparatus is adapted to terminate the brake force control of the vehicle when the road surface detecting means detects the road surface under road heating and when the assuming means assumes that the vehicle is in the state of the predetermined speed, for example, in the state of the speed for terminating the antiskid control, the antiskid control can be terminated at appropriate timing without degradation of stability of the vehicle even if the vehicle is on the road surface under road heating.

The antiskid control apparatus is characterized in that the road surface detecting means detects the road surface under road heating when the vehicle speed computed from the speeds of the wheels is within a predetermined range throughout a predetermined time. This antiskid control apparatus can detect the road surface under road heating properly, because the road surface under road heating is detected, based on the condition that the vehicle speed is within the predetermined range throughout the predetermined time.

The antiskid control apparatus is characterized in that when the vehicle speed is a reference speed greater than the predetermined speed, the assuming means computes a time necessary for the vehicle to reach the predetermined speed, based on a deceleration computed, and the assuming means assumes after a lapse of the time thus computed that the vehicle is in the state of the predetermined speed. This antiskid control apparatus can terminate the antiskid control at appropriate timing even if the vehicle is on the road surface under road heating.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
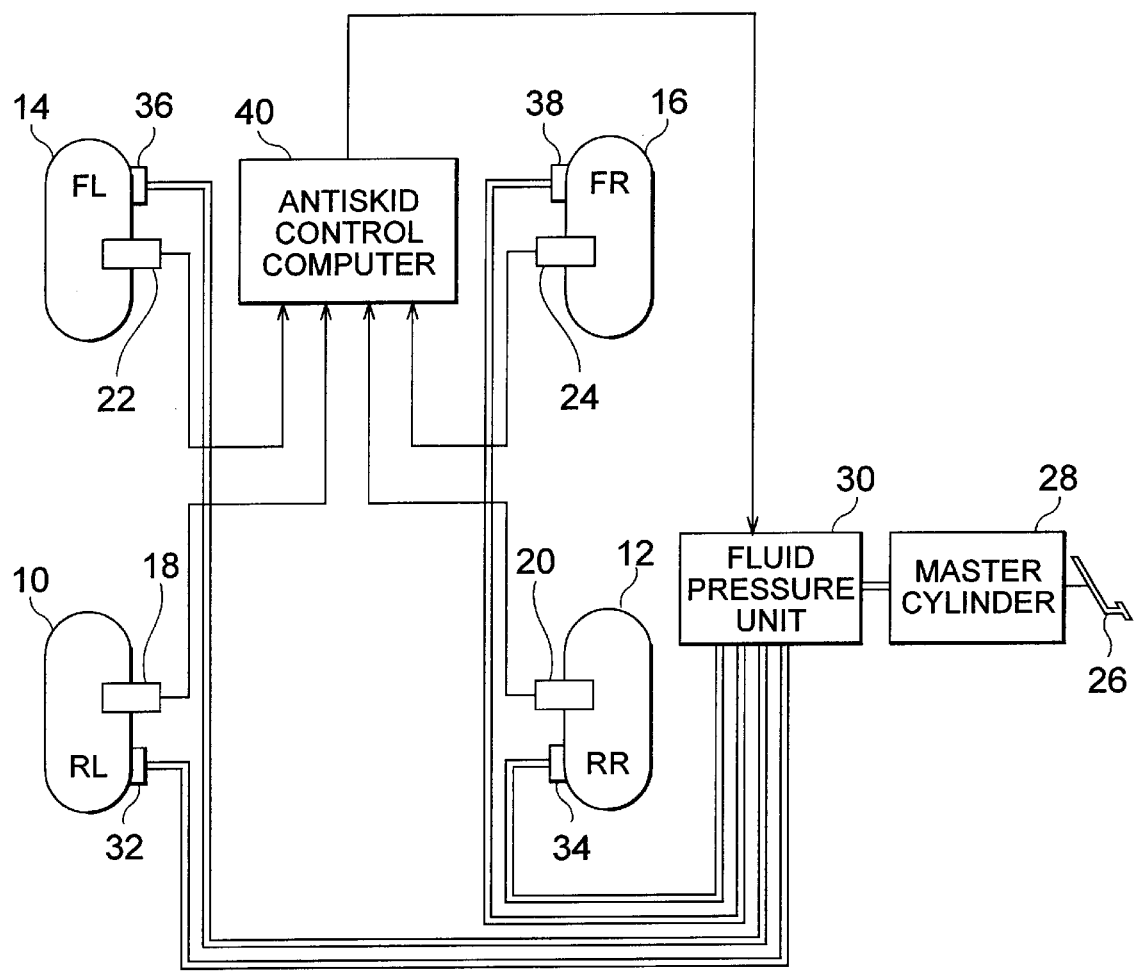
FIG. 1 is a schematic, structural diagram of the antiskid control apparatus according to an embodiment of the present invention.

The embodiment of the present invention will be described by reference to FIG. 1 to FIG. 3. FIG. 1 is a schematic, structural diagram of the antiskid control apparatus according to the embodiment of the present invention. In FIG. 1, numerals 10, 12 designate the left rear wheel and the right rear wheel as drive wheels and numerals 14, 16 the left front wheel and the right front wheel as follower wheels. The left rear wheel 10 and the right rear wheel 12 of the drive wheels are provided each with an electromagnetic induction type speed sensor 18 or 20, respectively, for detecting the wheel speed $V_{WRL}$ or $V_{WRR}$ of the respective drive wheels. The left front wheel 14 and the right front wheel 16 of the follower wheels are provided each with an electromagnetic induction type speed sensor 22 or 24, respectively, for detecting the wheel speed $V_{WFL}$ or $V_{WFR}$ of the follower wheels.

Numeral 26 denotes the brake pedal, and brake fluid pressure generated by master cylinder 28 according to a stepping-on measurement of the brake pedal is transmitted via fluid pressure unit 30 to wheel cylinders 32, 34 provided for the left and right drive wheels 10, 12 and to wheel cylinders 36, 38 provided for the left and right follower wheels 14, 16.

Figure 2:
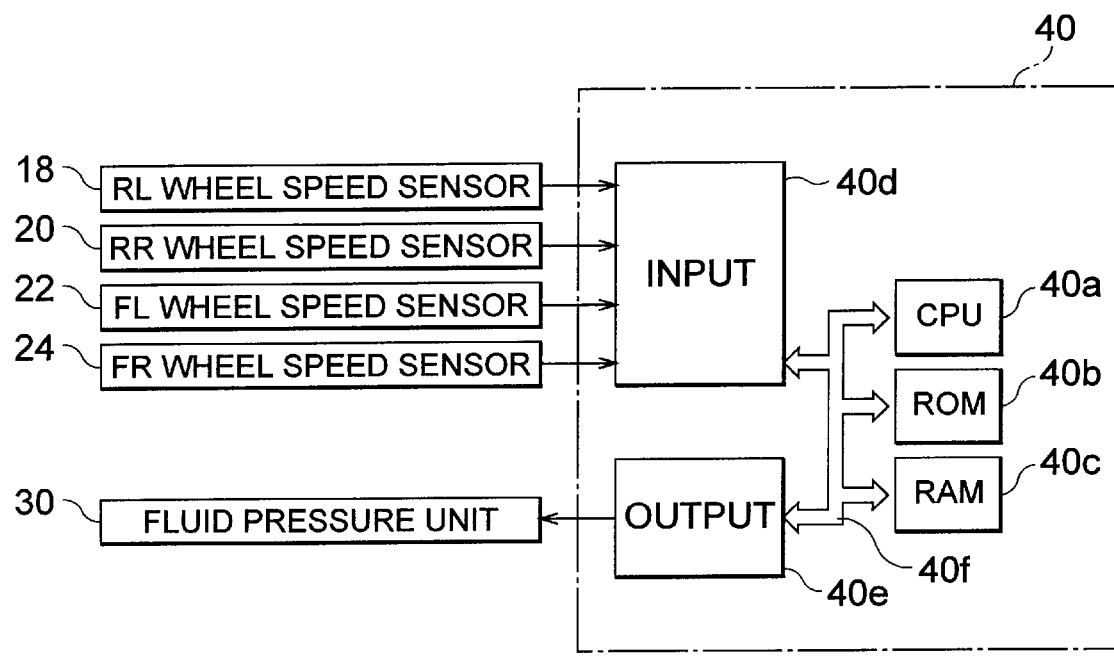
FIG. 2 is a block diagram to show the structure of an antiskid control computer according to the embodiment of the present invention.

Numeral 40 represents an antiskid control computer, and this antiskid control computer 40 has a central processing unit (CPU) 40a, as illustrated in FIG. 2. Connected to this CPU 40a via a bus line 40f are a read only memory (ROM) 40b for storing a program for the antiskid control, a program for terminating the antiskid control with detection of a road surface under road heating, and other programs, a random access memory (RAM) 40c for storing output signals from the respective speed sensors 18, 20, 22, 24 described above, and other data, an input section 40d provided with a multiplexer for selectively outputting the output signals from the respective speed sensors 18, 20, 22, 24 to the CPU 40a, or the like, and an output section 40e for outputting a control signal to the fluid pressure unit 30.

Here the CPU 40a receives the sensor signals outputted from the respective electromagnetic induction type speed sensors 18, 20, 22, 24 via the input section 40d and outputs the control signal to the fluid pressure unit 30 via the output section 40e, thereby controlling the brake fluid pressure of the wheel cylinders 32, 34, 36, 38 of the respective wheels. Further, based on the sensor signals outputted from the respective electromagnetic induction type speed sensors 18, 20, 22, 24 or the like, the CPU 40a terminates the antiskid control at a predetermined time after it detects that the heater noise is superimposed on the sensor signals outputted from the speed sensors 18, 20, 22, 24 of the respective wheels, i.e., that the road surface is under road heating.

Figure 3:
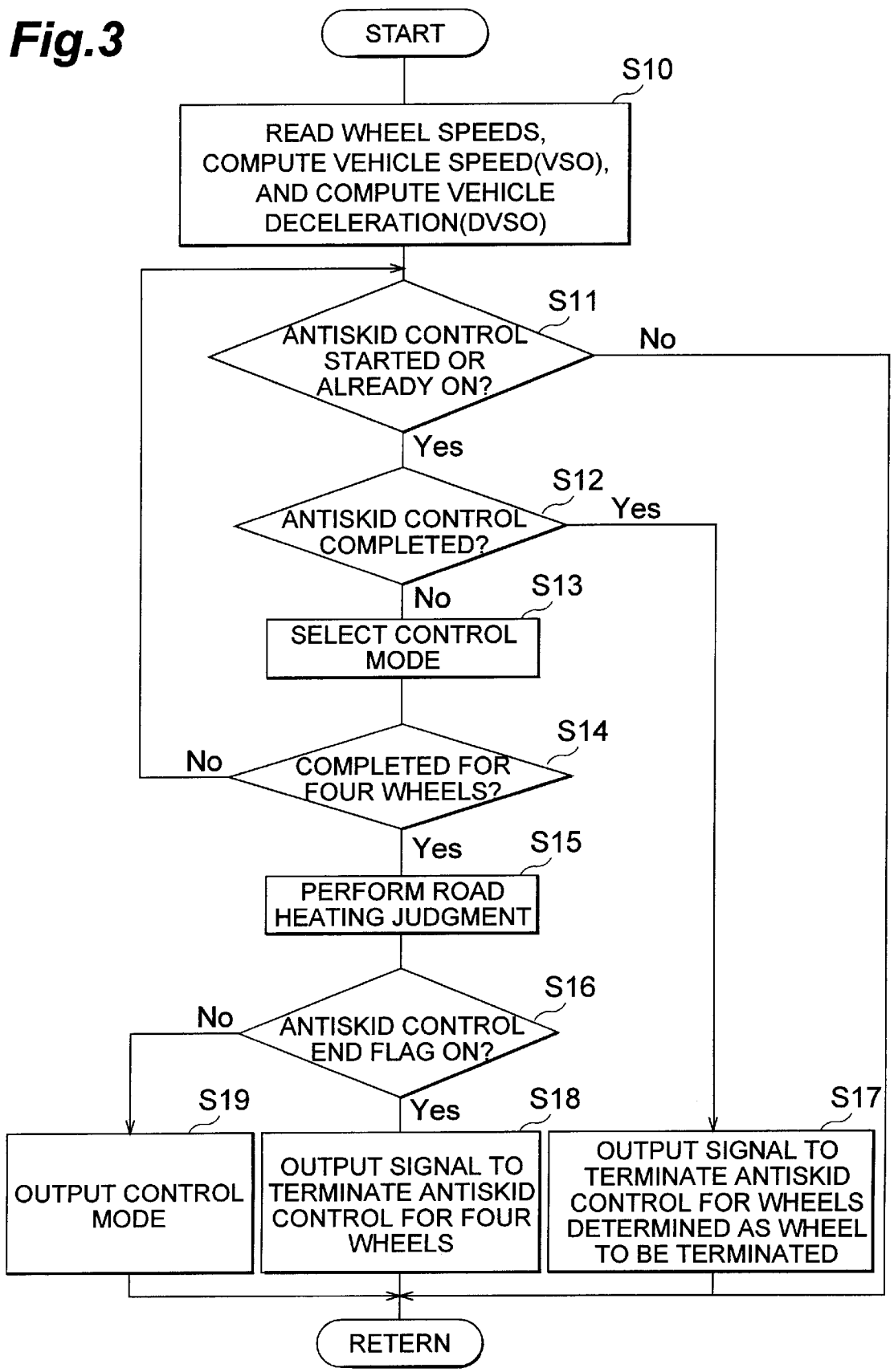
FIG. 3 is a flowchart for explaining the processing of the antiskid control computer according to the embodiment of the present invention.
Figure 4:
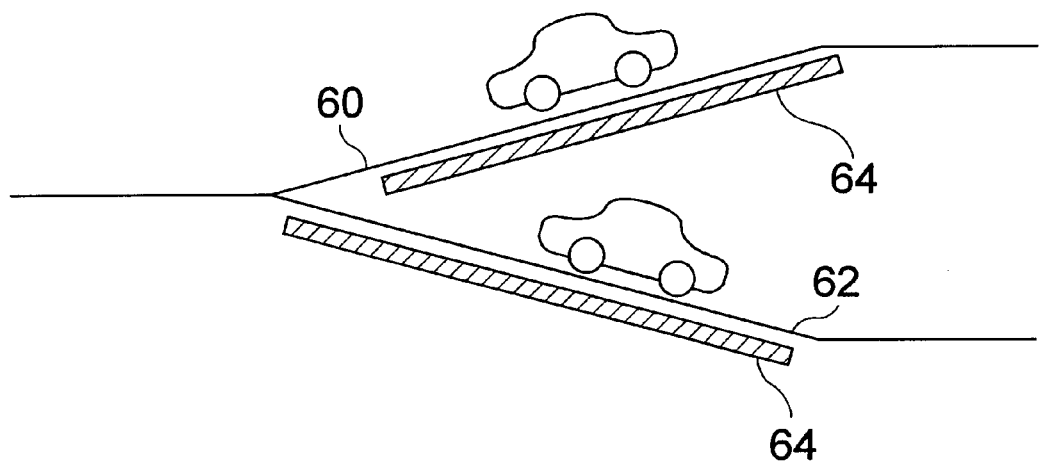
FIG. 4 is a diagram for explaining the buried state of road heaters.

Now described referring to the flowchart of FIG. 3 is the process for terminating the antiskid control with detection of the road surface under road heating, which is carried out in the antiskid control computer 40.

First, the antiskid control computer 40 reads the wheel speed $V_{WRL}$ of the left rear wheel 10, the wheel speed $V_{WRR}$ of the right rear wheel 12, the wheel speed $V_{WFL}$ of the left front wheel 14, and the wheel speed $V_{WFR}$ of the right front wheel 16 detected by the respective speed sensors 18, 20, 22, 24 of the left rear wheel 10, the right rear wheel 12, the left front wheel 14, and the right front wheel 16, and carries out an operation to compute vehicle speed (VSO) and an operation to compute vehicle deceleration (DVSO) (step S10).

The next step is to determine whether the condition for activation of the antiskid control for the left rear wheel 10 is met or whether the antiskid control is under way (step S11). When it is determined here that the condition for activation of the antiskid control is not met or that the antiskid control is off, the flow returns to the operation at step S10. On the other hand, when it is determined that the condition for activation of the antiskid control is met or that the antiskid control is under way, it is then determined whether there arises a situation for terminating the antiskid control, for example, a situation wherein the vehicle speed becomes zero, a situation wherein stepping-on of the brake pedal 26 is released, and so on (step S12). In this step S12, when it is determined that a situation for terminating the antiskid control is raised, the CPU outputs the control signal to the fluid pressure unit 30 in order to terminate the antiskid control for the left rear wheel 10 (step S17). On the other hand, when it is determined in step S12 that any situation for terminating the antiskid control is not raised, mode selection is carried out to select either one of modes (pressure increase, pressure decrease, and pressure retention) for the antiskid control (step S13).

It is then determined whether the operations of step S11 to step S13 have been carried out for all the four wheels (step S14). In this case, since the process is finished only for the left rear wheel 10, the operations of step S11 to step S13 are carried out for each of the right rear wheel 12, the left front wheel 14, and the right front wheel 16.

When it is determined in step S14 that the operations of step S11 to step S13 have been carried out for all the four wheels, a road heating judgment is carried out (step S15). Namely, it is determined whether the vehicle speed (VSO) satisfied the condition of Eq. 1 or Eq. 2 below continuously for a predetermined time. When the vehicle speed (VSO) continuously satisfied the condition of Eq. 1 or Eq. 2 for the predetermined time, it is judged that the vehicle is on the road surface under road heating in a high likelihood, because there is no variation in the vehicle speed for the constant time.

$$V1-A \text{ km/h} \leq VSO \leq V1+A \text{ km/h} \qquad \text{(Eq. 1)}$$

V1: 50 Hz-equivalent speed
A: constant $$V2-A \text{ km/h} \leq VSO \leq V2+A \text{ km/h} \qquad \text{(Eq. 2)}$$

V2: 60 Hz-equivalent speed
A: constant

When the vehicle speed (VSO) continuously satisfied the condition of Eq. 1 or Eq. 2 for the predetermined time, an antiskid control end flag is turned on after a lapse of time T3, indicated by Eq. 3, since then. Namely, DVSO (the deceleration at the point of 60 Hz-equivalent speed+C km/h) is computed, the time T3 is then computed based on this deceleration, it is assumed after a lapse of the time T3 that the vehicle speed (VSO) reaches the speed for terminating the antiskid control, and the antiskid control end flag is turned on.

$$T3=[\{(60 \text{ Hz-equivalent speed}+C \text{ km/h})-B\}/3.6 \text{ (m/s)}]/[DVSO(60 \text{ Hz-equivalent speed}+C \text{ km/h})*9.81(\text{m/s}^2)] \qquad \text{(Eq. 3)}$$

DVSO(60 Hz-equivalent speed+C km/h): DVSO at the point of 60 Hz-equivalent speed+C km/h
B: constant
C: constant It is next determined whether the antiskid control end flag is on (step S16). When the antiskid control end flag is on, the CPU outputs the control signal to the fluid pressure unit 30 to terminate the antiskid control for all the four wheels (step S18). On the other hand, when the antiskid control end flag is not on yet, the control mode selected in step S13 is outputted to each of wheels under the antiskid control (step S19). Therefore, the antiskid control computer 40 outputs the control signal for the antiskid control to the fluid pressure unit 30 and, based on this control signal, the fluid pressure unit 30 controls the brake fluid pressure of the wheel cylinders provided for the wheels under execution of the antiskid control.

Since the antiskid control apparatus of this embodiment is designed to estimate the vehicle speed with detection of the road surface under road heating and terminate the antiskid control when the estimated vehicle speed reaches the speed for terminating the antiskid control, the antiskid control can be terminated at appropriate timing where the vehicle goes into the road surface under road heating during the antiskid control; therefore, the apparatus can prevent unwanted continuation of the actuator sound and the transmission of vibration to the brake pedal.

The above embodiment employed the electromagnetic induction type speed sensors as magnetic rotational speed sensors, but, without having to be limited to this example, the sensors may be replaced by sensors using magnetoresistance elements (MR elements) or the like.

Since the apparatus of the present invention is arranged to terminate the brake force control of the vehicle when the road surface detecting means detects the road surface under road heating and when the assuming means assumes that the vehicle is in a state of the predetermined speed, for example, in a state of the speed for terminating the antiskid control, the antiskid control can be terminated at appropriate timing even if the vehicle is on the road surface under road heating; therefore, the apparatus can prevent unwanted continuation of the actuator sound and the transmission of vibration to the brake pedal.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An antiskid control apparatus having magnetic rotational speed sensors provided for respective wheels and adapted to control brake force, based on a speed of a first wheel and a speed of a second wheel during braking of a vehicle, said antiskid control apparatus comprising road surface detecting means for detecting a road surface under road heating, and assuming means for assuming that the vehicle is in a state of a predetermined speed, wherein when said road surface detecting means detects the road surface under road heating during execution of the brake force control of the vehicle and when said assuming means assumes that said vehicle is in the state of the predetermined speed, the brake force control of the vehicle is terminated.

2. The antiskid control apparatus according to claim 1, wherein when a vehicle speed computed from the speeds of the wheels is within a predetermined range throughout a predetermined time, said road surface detecting means detects the road surface under road heating.

3. The antiskid control apparatus according to claim 1, wherein when the vehicle speed is a reference speed greater than said predetermined speed, said assuming means computes a time necessary for said vehicle to reach said predetermined speed, based on a deceleration computed, and said assuming means assumes after a lapse of the time thus computed that said vehicle is in the state of said predetermined speed.

* * * * *